May 28, 1963   R. L. ATKINSON   3,091,101
MACHINERY GUARDS
Filed April 28, 1961   2 Sheets-Sheet 1
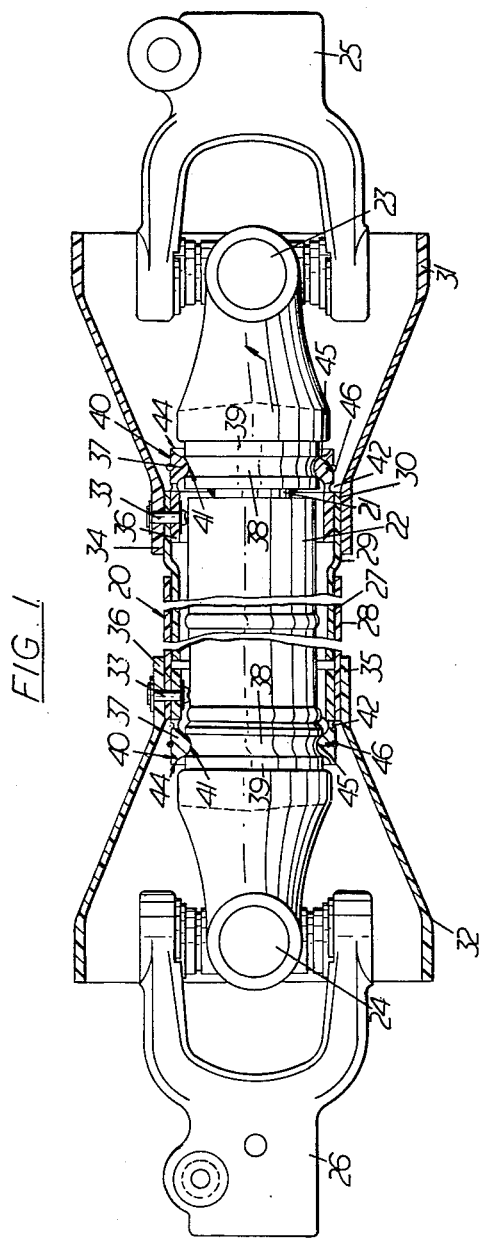
FIG. I
Inventor:
RICHARD LESLIE ATKINSON
By Squire and Olcott
Attorneys.

May 28, 1963  R. L. ATKINSON  3,091,101
MACHINERY GUARDS
Filed April 28, 1961  2 Sheets-Sheet 2
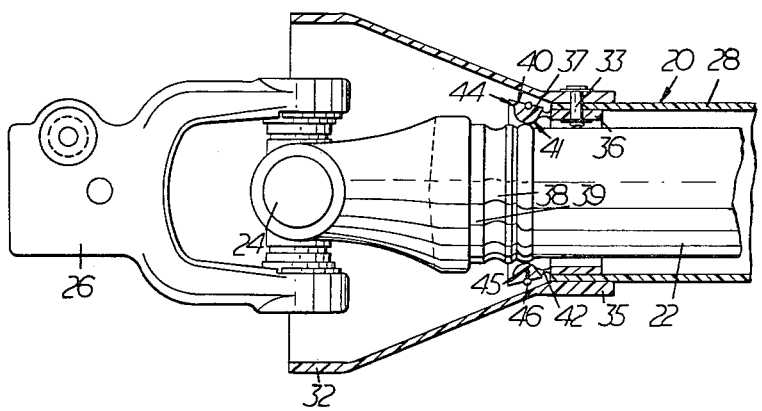
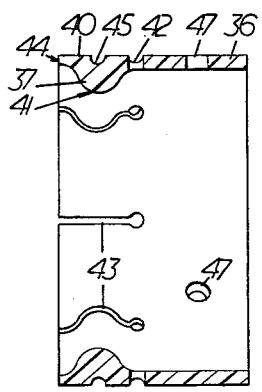
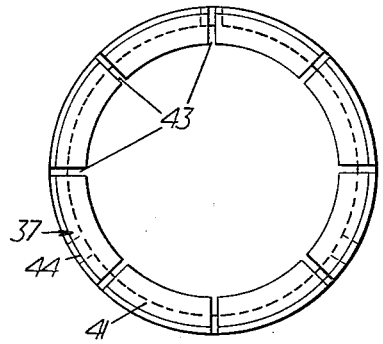
Inventor:
RICHARD LESLIE ATKINSON
By Squire and Olcott
Attorneys.

United States Patent Office 3,091,101
Patented May 28, 1963

3,091,101
MACHINERY GUARDS
Richard Leslie Atkinson, Bolton-by-Bowland, near Clitheroe, England, assignor to Atkinson's Agricultural Appliances Ltd., Clitheroe, England, a British company
Filed Apr. 28, 1961, Ser. No. 106,397
Claims priority, application Great Britain May 21, 1960
12 Claims. (Cl. 64—4)

This invention relates to machinery guards, and more particularly to safety guards of the kind comprising a tubular sheath adapted floatingly to encompass and be supported by a rotatable shaft. The invention relates also to bearings adapted to be mounted internally of such guards to enable the guards to float when in position about shafts adapted to rotate when the machinery is in operation.

A particular application of safety guards of the kind aforesaid is their use with shaft couplings of the kind comprising a telescopic shaft provided at each of its ends with a universal joint from which extend stub shafts for connection to driving and driven machinery, respectively. Such telescopic shafts, as now being supplied to industry, generally have an annular groove machined in the yoke boss to that side of each universal joint remote from the stub shaft, these annular grooves being intended to provide races for balls of the bearings enabling safety guards to float on the shafts when mounted in encompassing relationship therewith.

An object of the present invention is to provide safety guards of the kind aforesaid adapted for use with shaft couplings of the kind aforesaid having an annular groove machined in the yoke boss to that side of each universal joint remote from the stub shaft, said guards being efficient, readily fitted on and removed from the shaft couplings, and less costly than safety guards of the kind aforesaid heretofore available.

The present invention is a safety guard of the kind aforesaid for use with shaft couplings of the kind aforesaid having an annular groove machined in the yoke boss to that side of each universal joint remote from the stub shaft, said guard comprising two telescopically related sheaths each having internally attached thereto annular anti-friction bearing means adapted to be expanded circumferentially against resilient resistance, said bearing means being adapted when circumferentially relaxed to seat in one of said annular grooves when the guard is in encompassing relationship with the telescopic shaft.

The present invention is also a tubular sheath having internally attached thereto annular anti-friction bearing means adapted to be expanded circumferentially against resilient resistance, said bearing means being adapted when circumferentially relaxed to seat in an annular groove in a shaft when the sheath is in encompassing relationship with the shaft.

The present invention is also annular anti-friction bearing means adapted to be expanded circumferentially against resilient resistance and shaped to seat when circumferentially relaxed in an annular groove in a shaft, and provided with means for attaching same internally to a tubular sheath, said attaching means being adapted to flex so as to permit said circumferential expansion. Said attaching means may be, for example, a collar integral with the annular bearing means and of a size snugly to fit within the sheath, a portion or neck of reduced thickness interconnecting or bridging between the annular bearing means and the collar so that the annular bearing means can flex relative to the collar when being push fitted into position to seat in an annular groove in a shaft.

An embodiment of the invention will now be described, by way of example, with reference to the accompanying drawings, in which:

FIG. 1 is a longitudinal section of a machinery guard in accordance with the invention mounted about a telescopic shaft provided at each of its ends with a universal joint from which extend stub shafts for connection to driving and driven machinery, respectively;

FIG. 2 is a view corresponding to the left-hand end of FIG. 1, but showing the annular anti-friction bearing means expanded circumferentially, prior to push fitting same into position in the annular groove in the shaft;

FIG. 3 is an axial section through the annular bearing means; and

FIG. 4 is a front elevation of the annular bearing means.

Referring now to the drawings, throughout which the same parts are all denoted by like reference numerals, a machinery guard 20, which is intended for use with a shaft coupling comprising a telescopic shaft 21, 22 provided at each of its ends with a universal joint 23, 24, respectively, from which extend stub shafts 25, 26, respectively, for connection one to driving machinery and the other to driven machinery, comprises two telescopically-engaging tubular sheaths 27, 28 of which the inner one 27 is a sliding fit within the other 28 and is locally offset outwardly near its outer end at 29 to provide an end portion 30 of substantially the same diameter as the outer sheath 28, the annular shoulder 29 thus formed at the offset defining the extent to which the inner sheath 27 can telescope within the outer sheath 28. The sheaths 27 and 28 are preferably of rigid polyvinyl chloride, but may be of, say, polythene or other suitable synthetic resin, or other suitable material resistant to deterioration on exposure in the open air.

Frusto-conoidal end portions 31, 32, respectively, are secured to the outer ends of the sheaths 27, 28, by means of rivets 33. Manifestly the end portions could be otherwise secured to the outer ends of the sheaths, but riveting is a convenient method in the present embodiment, as will hereinafter appear. Three circumferentially spaced rivets 33 suffice for securing each end portion to each sheath, but any convenient number could be used, consistent with adequate strength in the joint. As can be seen from FIGS. 1 and 2, the end portions have at their ends of minimum diameter, integral sleeves 34, 35, respectively, which fit snugly about the ends of the sheaths 27, 28 and through which they are secured to the latter by the rivets 33. The end portions 31, 32, like the sheaths 27, 38 are of material resistant to deterioration on exposure out of doors, such as polythene, for example, and may be rigid, semi-rigid or substantially flexible.

There is mounted internally of, and at the outer end of, each sheath, and secured thereto by the rivets 33 securing the end portions 31, 32 thereon, a collar 36 which is a snug fit within the sheath and is integral with a bearing ring 37 adapted to seat in an annular groove 38 provided in the yoke boss 39 to that side of the universal joint 23 or 24 remote from the stub shaft 25 or 26. The annular bearing means comprising the ring 37, and the attachment means therefor, namely the collar 36, are identical at each end of the guard, and only one need be described, the same reference numerals being applied to both in FIG. 1. The ring 37 has a cross-section of substantially D-shape with the flat side 40 at the major diameter, the part-circular portion 41 being of radius substantially the same as, or slightly less than, that of the groove 38. The ring 37 is connected to the collar 36 by a neck or portion 42 of relatively reduced thickness by virtue of which the ring 37 can flex relative to the collar 36. The ring has several, for example eight as shown in FIG. 4, slits or slots 43 cut therein, said slots 43 extending parallel to the axis of the ring and from the ring edge 44 remote from the neck 42. The flat outer side of the ring 40 has an anular groove 45, disposed centrally thereof, in which seats a spring steel securing clip 46. The integral bearing component comprising the collar 36, the neck 42 and the ring 37, is of anti-friction material such as nylon. The holes in the collar for the rivets 33 are denoted 47 in FIG. 3.

When fitting the machinery guard just described tbout a telescopic shaft, the shaft parts 21, 22 are disconnected, as are also the tubular sheaths 27, 28. A thin film of light grease is smeared in the annular bearing groove 38 of each shaft part 21 and 22, and on the inside part-circular surface 41 of each bearing ring 37. The part 21 of the shaft is fitted into the tubular sheath 27 and the part 22 of the shaft is fitted into the tubular sheath 28. When this operation is carried out, each shaft part is pushed, with its end which mates with the other shaft part leading, into the end piece 31 or 32 and along the sheath. The bearing ring 37 rides along the annular surface of the shaft part, and is expanded circumferentially against its inherent resilient resistance and the resilient resistance of the securing clip 46 therearound on coming up against the yoke boss 39, the neck 42 permitting such circumferential expansion by flexing relative to the fixedly-mounted collar 36. The bearing ring 37 slides along the boss until reaching the annular bearing groove 38 into which the ring fits with a sharp snap action. Correct fitting is checked by rotating the shaft part within the tubular sheath. Any necessary length adjustment of the tubular sheaths is then effected by cutting off any excessive length, it being proper that the ends of the shaft parts should project slightly from the ends of the tubular sheaths. The shaft parts 21 and 22 are then re-connected and the sheath 27 telescoped into the sheath 28 at the same time. The telescopic shaft with the guard 20 fitted therearound can now be fitted between a tractor power-take-off and an implement to be driven therefrom.

When the telescopic shaft with the guard 20 is so fitted, and the machinery is driven, the guard 20 will usually rotate with the shaft but will stop rotating and float on the shaft in the event that any pressure is applied thereto, for example by someone laying a hand on the guard.

When fitting the telescopic shaft to the tractor power-take-off and implement mechanism, these operations are facilitated by pulling the related tubular sheath free from the yoke boss, a sharp pull being sufficient, and withdrawing the sheath along the shaft to expose the end of the shaft. The universal joints can be readily exposed for lubrication purposes by the same procedure when the shaft is coupled up. The annular bearing groove could be lubricated at the same time.

Thus the machinery guard can be fitted on and removed from the telescopic guard very easily and without the need of tools, save possibly for a sharp knife or hacksaw in the course of initial fitment.

I claim:

1. The combination of an extensible shaft comprising telescopically-associated shaft parts, the respective shaft parts having annular grooves providing inner bearing races, telescopically-related guard sheaths surrounding said shaft parts and extending across the respective bearing races, anti-friction bearing means seated in said respective bearing races and adapted to be expanded circumferentially at least to an extent sufficient wholly to extract them from said grooves, means connecting the respective bearing means with the respective sheaths and permitting the circumferential expansion of said bearing means, and resilient means engaging circumferentially about said respective bearing means and constraining same to seat in said respective bearing races, the respective resilient means being adapted to be overcome by a sharp axial pull on the respective sheath in the direction telescoping said sheaths thereby to unseat said respective bearing means and permit withdrawal along the respective shaft part of said respective sheath together with said respective bearing means thus to expose said respective bearing race.

2. The combination of an extensible shaft comprising telescopically-associated shaft parts, the respective shaft parts having annular grooves of part-circular cross-section providing inner bearing races, telescopically-related guard sheaths surrounding said shaft parts and extending across the respective bearing races, anti-friction bearing means seated in said respective bearing races and adapted to be expanded circumferentially, a collar secured internally to each sheath and spaced from the respective bearing means in the direction telescoping said sheaths, a neck of lesser thickness than said collar bridging between said collar and said respective bearing means and integrating each with the other, said neck permitting flexure of said respective bearing means relative to said collar, and resilient means engaging circumferentially about said respective bearing means and constraining same to seat in said respective bearing races, the respective resilient means being adapted to be overcome by a sharp axial pull on the respective sheath in the direction telescoping said sheaths thereby to unseat said respective bearing means and permit withdrawal along the respective shaft part of said respective sheath together with said respective bearing means thus to expose said respective bearing race.

3. The combination set forth in claim 2, in which each said bearing means is annular and substantially D-shaped in cross-section with a flat surface at the major diameter and a part-circular surface nesting in the respective bearing race and of a radius slightly less than that of said respective bearing race, said bearing means having several circumferentially-spaced slits parallel to the axis of said bearing means, said slits extending from that edge of said bearing means remote from said neck.

4. The combination set forth in claim 2, in which each said bearing means has an annular groove centrally of its said flat outer surface, and said resilient means is an annular spring steel securing clip seated in said annular groove in said flat outer surface.

5. A power shaft assembly comprising first and second telescopically-interconnected shafts respectively having first and second means concentrically thereon and affording first and second annular grooves opening radially outwardly and axially spaced apart; first and second telescopically-related tubular sheaths concentrically encircling said shafts, first and second annular bearing means seated respectively in said first and second annular grooves and adapted to be expanded circumferentially at least to an extent sufficient wholly to extract them from said grooves, first and second means respectively connecting said first and second bearing means to said first and second sheaths, and permitting the circumferential expansion of each said bearing means, and first and second resilient means respectively circumscribing said first and second bearing means and adapted to yield circumferentially, at least to an extent permitting extraction of the respective bearing means from the respective groove, on the respective sheath being pulled sharply in the direction telescoping the sheaths.

6. A power shaft assembly comprising first and second telescopically-interconnected shafts respectively having first and second means concentrically thereon and affording first and second annular grooves opening radially outwardly and axially spaced apart; first and second telescopically-related tubular sheaths concentrically encircling said shafts, first and second annular bearing means seated respectively in said first and second annular grooves and adapted to be expanded circumferentially at least to an extent sufficient wholly to extract them from said grooves, first and second collars fitting snugly within said first and second sheaths and spaced respectively from said first and second bearing means in the direction telescoping said sheaths, means securing said collars to said sheaths, first and second neck portions of lesser thickness than said collars and interconnecting said first and second collars and said first and second bearing means respectively, said neck portions permitting flexure of said first and second bearing means relative to said first and second collars respectively, and first and second resilient metal clips respectively circumscribing said first and second bearing means and adapted to yield circumferentially, at least to an extent permitting extraction of the respective bearing means from the respective groove, on the respective sheath being pulled sharply in the direction telescoping the sheaths.

7. A power shaft assembly comprising first and second telescopically-interconnected shafts respectively having first and second means concentrically thereon and affording first and second similar annular grooves opening radially outwardly and axially spaced apart, said grooves being of part-circular cross-section; first and second telescopically-related tubular sheaths concentrically encircling said shafts, first rings each of substantially D-shape in cross section having a flat surface at the major diameter and a part-circular surface of radius slightly less than that of said first and second annular grooves and resting in the latter, said first and second rings each having several circumferentially-spaced slits parallel to the ring axis, said slits penetrating one edge of each said ring, said one edge of each said rings being those which are remote from one another, said slits enabling said rings to expand circumferentially at least to an extent sufficient wholly to extract them from said grooves, first and second collars fitting snugly within said first and second sheaths and spaced respectively from said first and second rings in the direction telescoping said sheaths, means securing said collars to said sheaths, first and second neck portions of lesser thickness than said collars and interconnecting said first and second collars and said first and second rings respectively, said neck portions permitting flexure of said first and second rings relative to said first and second collars respectively, said first and second rings each having a circumferential groove substantially central of its said flat surface, first and second annular spring steel clips seated in said circumferential grooves and respectively circumscribing said first and second rings and seated in said grooves, said clips being adapted to yield circumferentially, at least to an extent permitting extraction of the respective rings from the respective groove, on the respective sheath being pulled sharply in the direction telescoping the sheaths.

8. An annular anti-friction bearing device enabling mounting of a guard sheath in concentric encircling relationship to a shaft which has therein an annular groove opening radially outwardly therefrom, said bearing device comprising annular bearing means adapted to be expanded circumferentially from a relaxed condition in which it can seat in said groove to a condition in which it can be totally withdrawn from said groove, annular resilient means encircling said bearing means and adapted to yield circumferentially an amount sufficient to permit said circumferential expansion of said bearing means, collar means adapted to be attached internally to said sheath, and means connecting said bearing means with said collar means and adapted to flex sufficiently to permit said circumferential expansion of said bearing means.

9. An annular anti-friction bearing device enabling mounting of a guard sheath in concentric encircling relationship to a shaft which has therein a part-circular annular groove opening radially outwardly therefrom, said bearing device comprising a ring, having two edges, a series of slits extending axially of said ring and penetrating one edge thereof, said slits being spaced apart circumferentially of said ring and enabling said ring to be expanded circumferentially from a relaxed condition in which it can seat in said groove to an expanded condition in which it can be totally withdrawn from said groove, said ring being substantially D-shaped in cross-section with a flat surface portion defining the outer circumference of the ring and an opposed arcuate surface portion adapted to seat in said groove, a collar adapted to fit snugly in said sheath and be secured internally of the latter, a neck portion of reduced thickness relative to said collar bridging between said collar and the other edge of said ring, said neck portion being adapted to flex sufficiently to permit said circumferential expansion of said ring, said ring having in its said flat surface centrally intermediate said two edges an annular groove, and an annular steel clip circumscribing said ring and seated in said groove, said clip being adapted to yield circumferentially at least to an extent enabling attainment by said ring of said expanded condition.

10. For use with a shaft having an annular groove opening radially outwardly therefrom, a tubular sheath adapted to encompass said shaft, annular anti-friction bearing means adapted to seat in said groove and to be expanded circumferentially at least to an extent permitting total withdrawal thereof from said groove, means connecting said bearing means internally to said sheath and permitting said circumferential expansion of said bearing means, and resilient means circumscribing said bearing means and adapted to yield sufficiently to permit said total withdrawal of said bearing means from said groove.

11. For use with a shaft having an annular groove opening radially outwardly therefrom, a tubular sheath adapted to encompass said shaft, a ring having an internal circumferential surface and an external circumferential surface, said internal circumferential surface being radiused in cross-section and being adapted to seat in said annular groove, said external circumferential surface being flat and having therein a centrally-disposed circumferential groove, a collar nesting snugly within said sheath, means securing said collar internally to said sheath, a neck portion of lesser thickness than said collar, said neck portion bridging between and integrating said ring and said collar, said ring having a plurality of axially-directed slits extending therealong from the collar-remote end thereof, said slits being spaced apart circumferentially of said ring and enabling expansion of said ring circumferentially to an internal diameter exceeding the diameter of said shaft adjacent said annular groove, said neck portion being adapted to flex sufficiently to permit said circumferential expansion of said ring, and a spring steel securing clip lodged in said circumferential groove and adapted when relaxed to maintain said ring at the diameter wherein said ring seats in said annular groove, and when expanded to enable said circumferential expansion of said ring.

12. For use with a shaft comprising two telescopically-related shaft parts each having adjacent its end remote from the other an annular groove opening radially outwardly therefrom, a guard adapted to encompass said shaft and comprising two telescopically-related tubular sheaths, annular anti-friction bearing means adapted to seat in each said groove and to be expanded circumferentially at least to an extent permitting total withdrawal thereof from said groove, means connecting each said bearing means internally to one said sheath and permitting said circumferential expansion of said bearing means, and resilient means circumscribing each said bearing means and adapted to yield sufficiently to permit said total withdrawal of said bearing means from said groove.

References Cited in the file of this patent

UNITED STATES PATENTS

| | | |
|---|---|---|
| 2,772,550 | Harrington | Dec. 4, 1956 |
| 2,919,562 | Weasler | Jan. 5, 1960 |
| 2,923,140 | Weasler | Feb. 2, 1960 |
| 2,965,418 | Edler | Dec. 20, 1960 |